Dec. 12, 1961 L. B. HAIGH ET AL 3,013,111

TELECOMMUNICATION LINK

Filed June 20, 1960 5 Sheets-Sheet 1

INVENTORS.
LESLIE B. HAIGH
THOMAS W. TUTTLE
BY Robert Lieber
ATTORNEY

INVENTORS.
LESLIE B. HAIGH
THOMAS W. TUTTLE
BY Robert Lieber
ATTORNEY

Dec. 12, 1961 L. B. HAIGH ET AL 3,013,111

TELECOMMUNICATION LINK

Filed June 20, 1960 5 Sheets-Sheet 3

INVENTORS.
LESLIE B. HAIGH
THOMAS W. TUTTLE

BY Robert Lieber

ATTORNEY

INVENTORS.
LESLIE B. HAIGH
THOMAS W. TUTTLE
BY Robert Lieber
ATTORNEY

Dec. 12, 1961 L. B. HAIGH ET AL 3,013,111

TELECOMMUNICATION LINK

Filed June 20, 1960 5 Sheets-Sheet 5

INVENTORS.
LESLIE B. HAIGH
THOMAS W. TUTTLE
BY Robert Lieber
ATTORNEY 3,013,111

TELECOMMUNICATION LINK

Leslie B. Haigh, West Orange, and Thomas W. Tuttle, Nutley, N.J., assignors to International Telephone and Telegraph Corporation, Nutley, N.J., a corporation of Maryland Filed June 20, 1960, Ser. No. 37,387
12 Claims. (Cl. 178—2)

This invention relates generally to telecommunication links, and particularly to the remote reception, storage, handling and retransmission of binary coded information signals in centralized telecommunication exchanges.

An exemplary centralized telegraph exchange of the type generally considered herein is shown and discussed at length in British Patent Number 790,914 (U.S. application Serial Number 433,742, filed June 1, 1954, now U.S. Patent No. 2,952,732, issued Sept. 13, 1960.), issued to E. P. G. Wright et al. for "a telecommunication exchange for the storage, routing and retransmission of intelligence."

One code used extensively in the transfer of binary coded intelligence into and out of such central telegraph exchanges is the start-stop telegraph code wherein the signals representing the code characters are arranged in predetermined signal groups, each including a given number of variable intelligence signal elements and a pair of invariant, opposite valued, group defining signal elements, characteristically termed stop and start signal elements, which distinguish successive code character groups. In transferring such signals into a centralized exchange, a receiving timing unit is generally cycled in synchronism with the transmitted character groups, each cycle or time sequence group, being initiated upon detection of a time reference signal level transition provided by the transition between stop and start signal elements. During each such cycle, a unique step or state of the timing unit is thus associated with each group element of a transmitted character. Those states of the timing unit which are associated with the variable intelligence signal elements of a character group, define time intervals during which the associated signal elements are sampled and transferred to predetermined cells of a buffer storage unit. Upon completion of each timing cycle, the variable intelligence signal group is transferred from the buffer store to a main storage unit within the exchange. In the interest of storage efficiency, the states of the timing unit which are associated with the invariant stop and start elements are used only to acquire or distinguish these elements in time. The corresponding signal levels are not stored, since the intelligence elements previously synchronized thereby, are synchronously processed through the exchange on a bit-by-bit basis, and the group defining stop and start elements are therefore unnecessary during this phase of the data handling. Upon retransmission, however, the stop and start elements are generally reinserted for group synchronizing purposes. In other words, outside the exchange the individual intelligence elements, or bits, may be asynchronously forwarded in synchronized intelligence groups with group synchronization provided by the group defining elements, while inside the exchange, the bits are synchronously transferred in association with element defining, or synchronizing, signals.

The utility of a telegraph link operating in the above manner is severely limited by the specialized nature of the above-mentioned cyclic timing operation and the associated specialized transfer of code character signal element groups, through the exchange, with the group defining start-stop elements excluded. In many instances, it would be highly desirable to be able to optionally process all received signal elements through the exchange. To illustrate, in transmitting a message in the above-mentioned telegraph code, it might be desirable to include, within the message text, digitally coded information derived from a source other than the telegraph transmitting equipment. An example of such a situation is provided, typically, in the transmission of a telegraph message wherein reference is made, in the message text, to data currently being accumulated in a digital computer operating in a code other than the above-mentioned telegraph code, and ultimately to be transferred to receiving equipment solely responsive to signal aggregates in the computer code, with the transfer to take place through the telegraph exchange under consideration. The conventional approach to the handling of such a message involves a conversion of the computer data signals into start-stop telegraph signal element groups wherein the individual element durations are to be associated, upon reception, with intervals by corresponding states of the receiver timing unit. The foregoing would thus require the retiming of the information bit rate of the data transferred from the computer output, as well as the insertion of group defining stop-start elements, for group synchronization purposes, at each such source of data. Further, at each message destination, a special receiver is required to delete the inserted elements. In accordance with the present invention, the desired result is more simply and economically achieved, in association with a number of subtle modifications to existing equipment within the exchange. A considerable advantage, afforded by this arrangement, derives from the location of the modified equipment at the telegraph link receiver, as opposed to the use of conversion equipment at each data source and destination, thus permitting simply modified exchange receiving and retransmitting units to economically service a multiplicity of subscribers transmitting and receiving differently coded data, and also saving each such subscriber the capital outlay which would normally be required for individual conversion units of the type considered.

Accordingly, it is an object of this invention to provide, in a telecommunication exchange, a receiving unit for receiving and transferring message signal elements, which is adapted to selectively group the received elements, and also to selectively include or exclude invariant signal elements in the associated transferred groups.

Another object is to provide, in a telecommunication exchange, a retransmitting unit for retransmitting messages routed through the exchange, which is adapted to selectively group the signal elements of a message to be retransmitted and also to selectively introduce invariant group elements into the message.

Still another object is to provide, in a telecommunication exchange, complementary receiving and retransmitting units which are respectively adapted to selectively delete and reinsert group invariant signal elements in messages handled through the exchange.

Another object of this invention is to provide a telecommunication link adapted to receive and selectively transfer signal elements of messages arranged in code character signal groups, in a given telegraph code, the group reception being synchronized by start-stop elements, and also to receive and selectively transfer signal elements of messages delivered in binary codes other than the given code, the latter elements being accompanied, in transmission, by element synchronizing signals.

It is a further object of this invention to provide improved telegraph reception and retransmission units for use in telecommunciation exchanges.

Still another object of this invention is to provide an improved telecommunication exchange having greater versatility than presently available facilities.

According to one feature of this invention, a receiving unit in a telecommunication exchange includes means for receiving message intelligence in groups of variable signal elements and means for transferring predetermined ones of the received group elements. The variable reception coupled with the predetermined transfer results in the variable exclusion of group elements from the message handled through the exchange. In one selective adjustment of the receiving means, in relation to the coding of the received message, the excluded elements are predetermined group invariant message elements which are unnecessary for the further handling of the message within the exchange, while, in another such selective adjustment, no elements are excluded from the message and it is transferred in unmodified form through the exchange.

According to another feature of the invention, a retransmitting unit in a telecommunication exchange includes means for storing the elements of a message previously routed through the exchange, in predetermined successive groups, at least one source of invariant signals, means for variably scanning each stored message element group along with the invariant signal source, and means for transmitting the scanned signals. The variable scanning coupled with the predetermied storage of the message elements in successive groups, results in the variable insertion of group invariant signal elements into the retransmitted message. In one selective adjustment of the variable scanning means, the inserted group invariant elements are elements which had previously been deleted, for economy in the subsequent handling of the message through the exchange, from the message as received, while in another such selective adjustment, the invariant source is not scanned and the message is retransmitted in unmodified groups, the message having been previously transferred in unmodified form through a receiving unit, as described above.

Another feature of this invention involves the provision, in a telecommunication exchange, of a selectively variable receiving unit including mode selection means for selectively adapting the unit to receive and transfer binary information signals in either a unique start-stop telegraph code format with the start and stop signal elements deleted prior to the transfer, or in other binary code formats, with none of the signal elements deleted. As previously indicated, equipment presently associated with the reception and transfer of signals in a given start-stop telegraph code format is peculiarly adapted to transfer all but the start and stop signal elements of each transmitted code character group, in association with time intervals defined by the states of a cyclically operated timing unit. Accordingly, the present receiving unit includes a selectively variable timing unit controlled by the above-mentioned mode selection means, this timing unit providing selectively variable element receiving cycles. In accordance with one of the selected cycles, two timing states, corresponding to the stop and start elements of conventionally arranged code signals, are utilized to exclude the stop and start elements from the transferred message, while in another selected cycle the above-mentioned two timing states are omitted and the message is accordingly received and transferred in unmodified fashion. Similarly, a retransmitting unit including a selectively variable timing unit, is provided at the out-going side of the exchange, for selectively reinserting stop and start elements solely where these elements have been previously excluded by the receiving unit.

These and other objects and features of the invention, and the advantages thereof will become more apparent by reference to the following description taken in conjunction with the accompanying drawings wherein.

Figures 1, 2, 3:
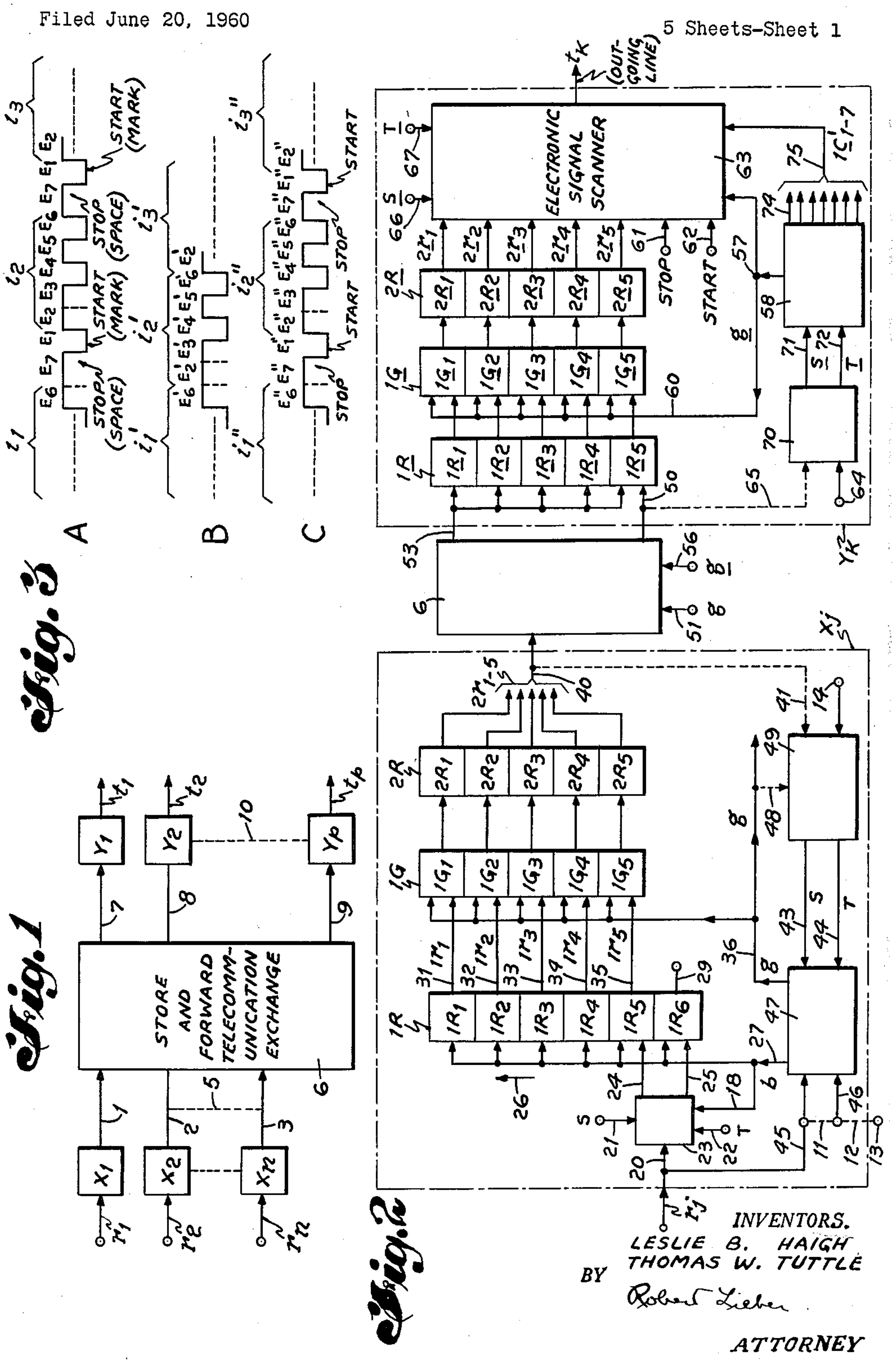
FIG. 1 is illustrative of a generalized telegraph exchange in accordance with this invention.
FIG. 2 is a schematic block diagram in greater detail of a particular receiving unit and a particular retransmitting unit coupled thereto through a switching exchange, said units including circuits arranged in accordance with the teachings of this invention.

FIG. 3 includes three timing diagrams, A, B and C, illustrative of code signal groupings characteristic of the handling of messages at three particular points in both prior art systems and one operational mode of the system of FIG. 2.

Figures 4, 4A, 5:
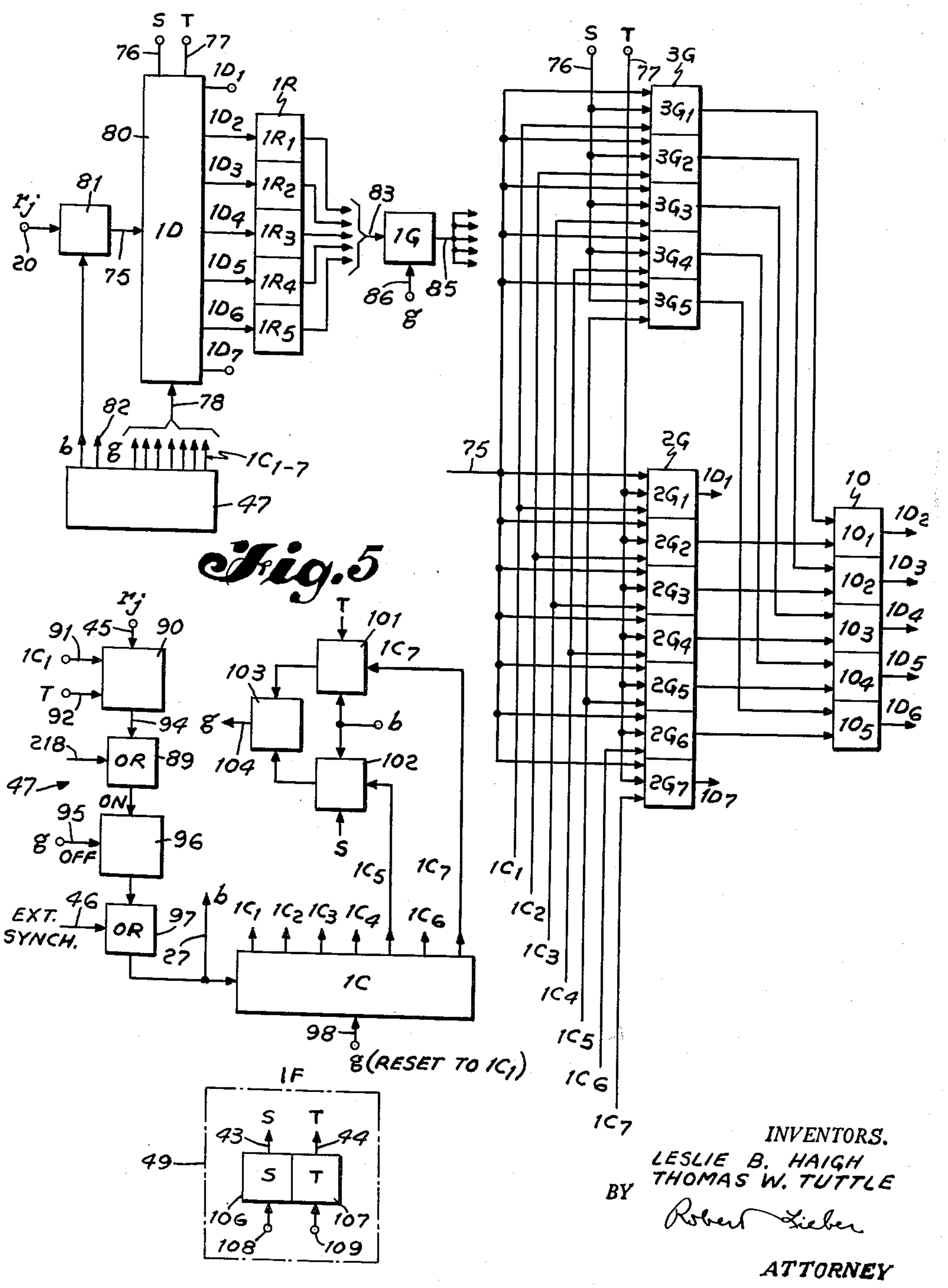

FIG. 4 is a schematic of an alternative circuit arrangement for use in the receiving units of FIG. 1, this arrangement being concerned with the acquisition and selective grouping of sgnals by the receiving units.

FIG. 4A is a schematic in detail of the distribution logic arrangement of FIG. 4.

FIG. 5 is a detailed drawing of a portion of the receiving unit of FIG. 2 illustrating the control circuits of the cyclic scanning means thereof.

Figures 6, 7:
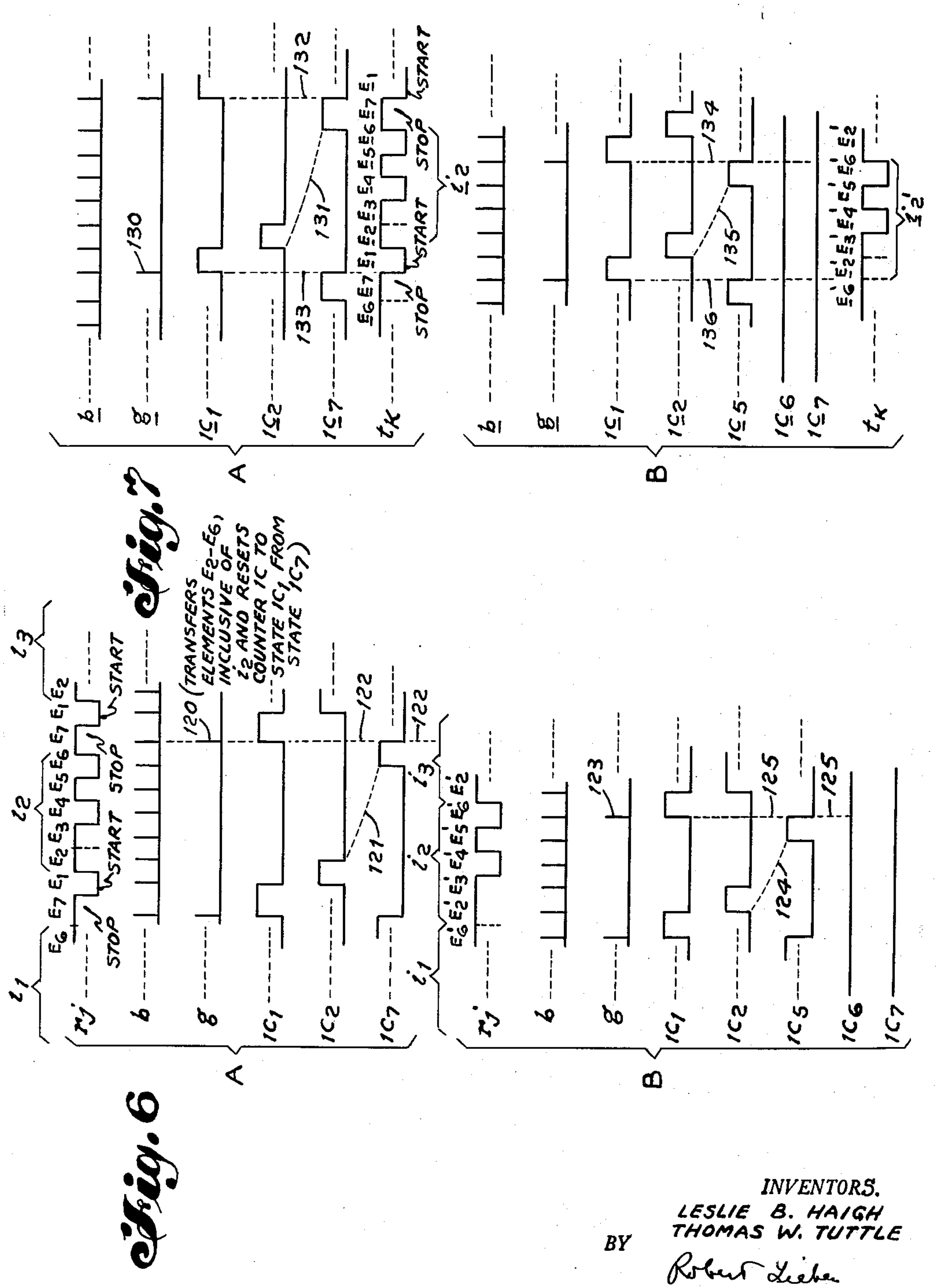

FIG. 6 includes two groups, A and B, of timing diagrams illustrative of different cyclic operating conditions of the receiving unit of FIG. 2.

FIG. 7 includes two groups, A and B, of wave form timing diagrams illustrative of different cyclic operating conditions of the retransmitting unit of FIG. 2.

Figure 8:
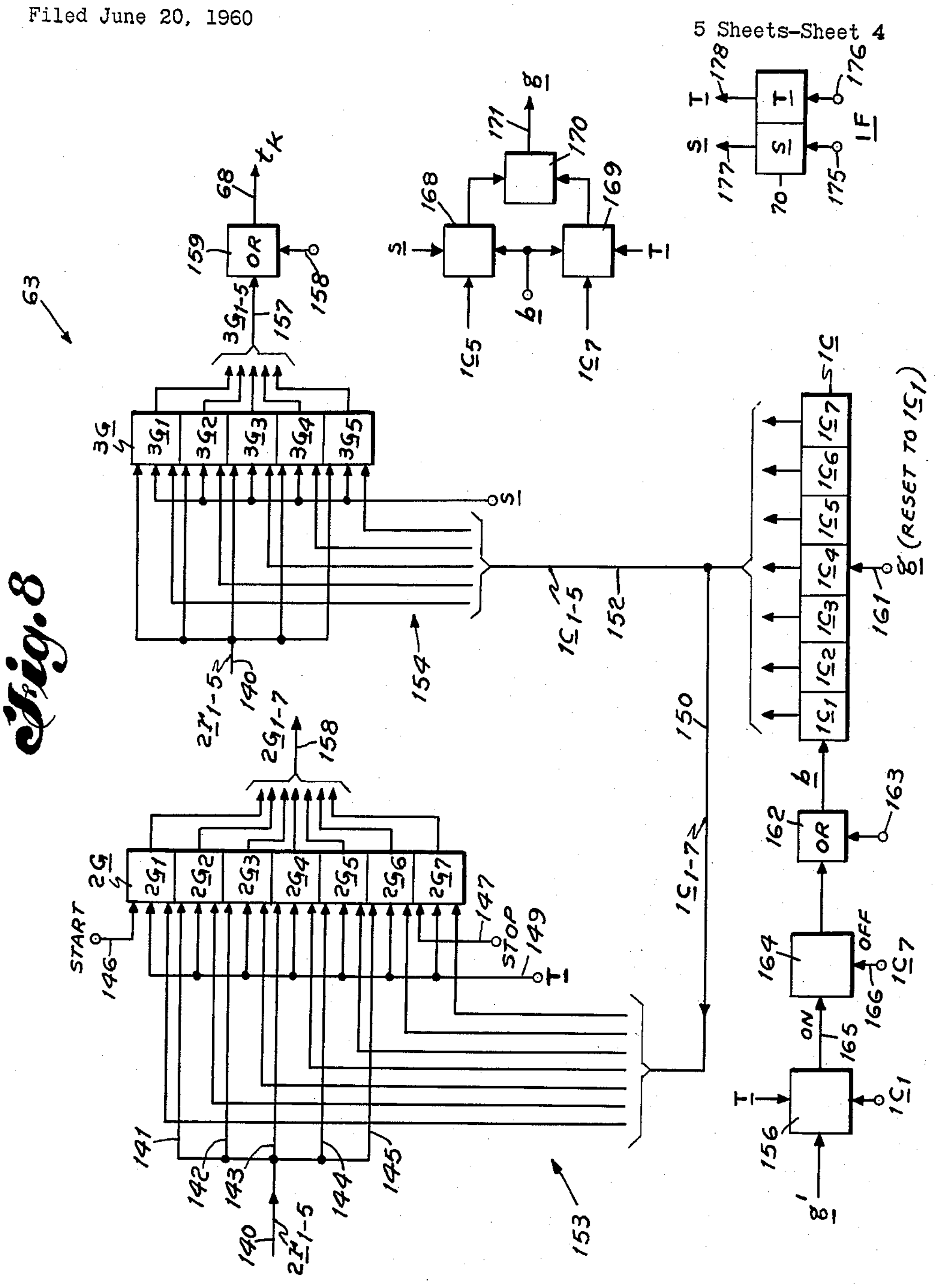

FIG. 8 is a drawing in detail of the scanning controls in the retransmitting unit of FIG. 2.

Figure 9:
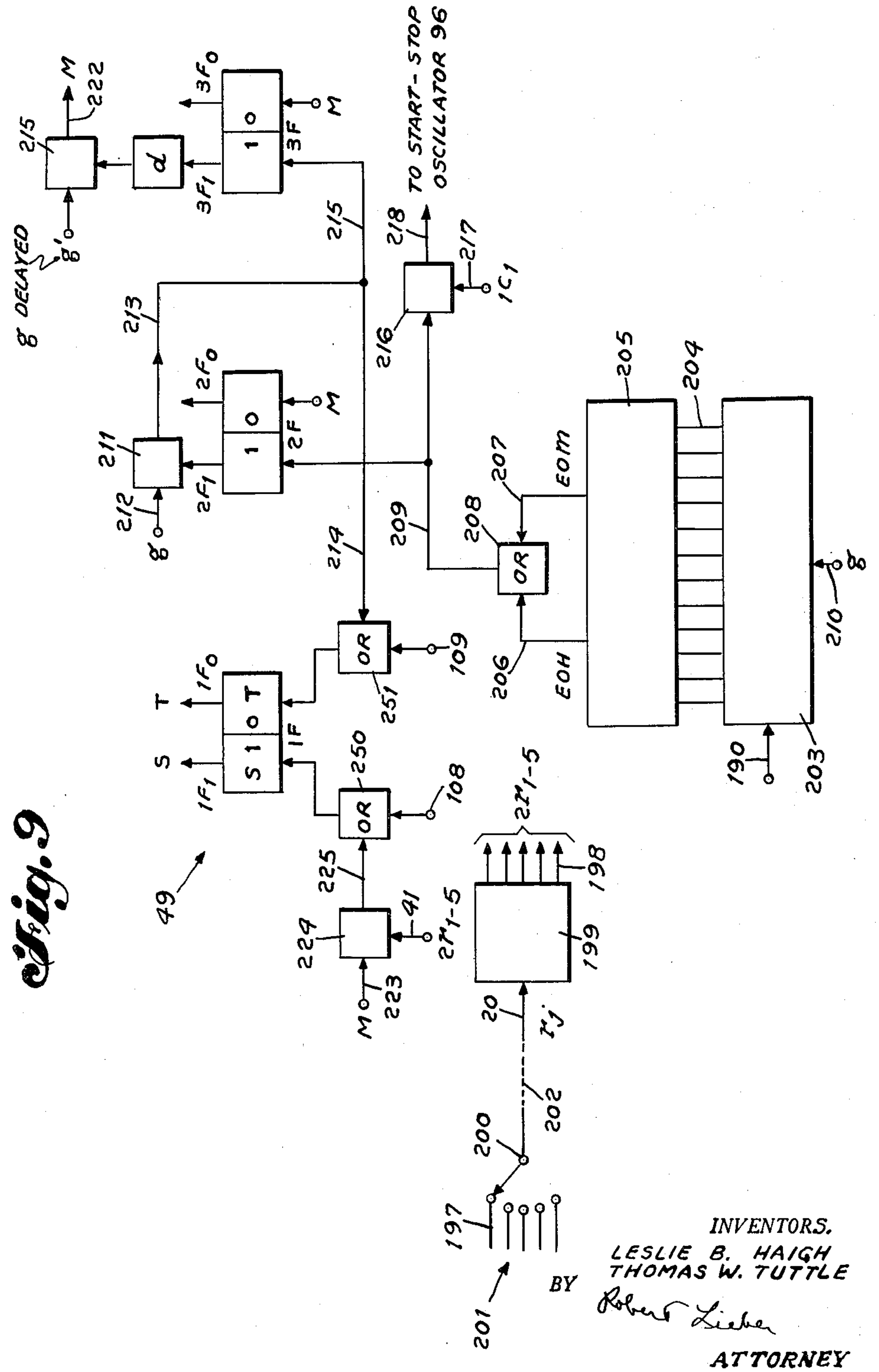

FIG. 9 is a block diagram of a circuit for automatically controlling the mode selection flip-flop of FIG. 5, thereby automatically controlling the cycling of the receiving unit of FIG. 2.

FIG. 1 is illustrative of a generalized switching exchange of the store and forward type, having, on the incoming side, a plurality of receiving lines designated $r_1$ to $r_n$, inclusive, and further having a plurality of retransmitting lines, $t_1$ to $t_p$, inclusive, at the outgoing side thereof. The foregoing integers $n$ and $p$ are of arbitrary value and not necessarily equal, these integers being determined by the number of direct subscriber lines transmitting information through the exchange, and the number of such lines receiving information from the exchange, respectively.

Associated with each receiving line $r_j$ in FIG. 1 is a receiving unit $X_j$, and similarly, associated with each of the retransmitting lines $t_k$ is a retransmitting unit $Y_k$. The receiving units are electrically connected to the exchange through conductors 1, 2 and 3, indicated specifically in FIG. 1 and conductors 5, shown generally by means of the dotted lines associated therewith, in FIG. 1. Similarly, the retransmitting units receive intelligence signals from the exchange through conductors 7, 8, 9 and 10 in FIG. 1.

The generalized exchange 6 intermediate the receiving unit outputs, and the retransmitting unit inputs is a store and forward exchange of the type disclosed in the above-mentioned British and United States Patent to Wright et al. Such exchanges generally receive intelligence from the receiving unit, store the intelligence in a first storage unit, then circulate the intelligence at a rapid element, or bit rate, to predetermined second storage units specified within each transmitted message. From each such second storage unit the information is subsequently transferred to an associated retransmitting unit, and thereafter retransmitted, at relatively low telegraph signalling rates, to the intended destination of the message. Although the invention is best utilized in connection with an exchange of the type just described, its utility is by no means limited thereto, and it should herewith be noted that the ensuing description is also applicable to other telegraph switching centers such as torn-tape telecommunication centers, and the like, which utilize intermediate recording media for routing messages and also to systems requiring special handling of message signals for cryptographic purposes, as will be shown hereafter.

In connection with FIG. 1, the illustrative timing diagrams A, B and C of FIGURE 3, provide examples of a conventional telegraph code signalling arrangement as observed respectively at one of the receiving lines, at points within the exchange, and at a retransmitting line of both prior art switching centers and centers, according to this invention, in one selective mode of operation thereof.

In FIG. 3A it will be observed that three consecutive items of intelligence are being received with time increasing from left to right in the figure. The three items are identified as $i_1$, $i_2$, and $i_3$, respectively, with $i_2$ shown in complete form, and $i_1$ and $i_3$ partially illustrated.

Referring to that portion of FIG. 3A associated with intelligence item $i_2$, it is seen that the item $i_2$ comprises part of a 7-element group of signal elements identified as $E_1$ to $E_7$, inclusive. Item $i_2$, as shown, includes signal elements $E_2$ to $E_6$, inclusive, while the group elements $E_1$ and $E_7$ are invariant start and stop elements. Elements $E_7$ and $E_1$ the last and first respective elements of adjacent groups, are invariably of opposite signalling value, their values being indicated as space and mark signalling conditions in the particular illustration. In FIG. 3B the information signals have progressed to the interior of the exchange 6, and are seen to comprise items $i_1'$, $i_2'$, and $i_3'$, propogating consecutively without intervening stop and start elements.

In FIG. 3C the information has been transferred to a selected outgoing line and now comprises items $i_1''$, $i_2''$, and $i_3''$ with stop and start elements again separating the intelligence items.

Accordingly, it is seen that in the above message transfer arrangement, intelligence items originate as 7-element start-stop signal groups, pass through the receiving unit where the stop and start elements are deleted and then circulate through the exchange to a retransmitting unit where the stop and start elements are reinserted, and the 7-element grouping format thereby re-established, in association with the retransmission of the intelligence to the required destination. It should be clearly understood at this point, that the above operational sequence represents the exclusive operation of the prior art switching centers under consideration, whereas, in systems constructed according to the teachings of this invention, the above sequence is only one of a plurality of selective sequences.

A number of general observations may be made in this connection. First, it may be observed that the operational sequence of FIG. 3, wherein start and stop elements are deleted from, and later reinserted into messages with no loss of message intelligence, is based upon a recognition of the fact that stop and start signal elements are group invariants. The term "group invariants," as used herein, refers generally to group elements having characteristics which either do not vary from group to group, or vary in a pedetermined or well regulated manner between successive groups. Thus, the stop and start elements $E_1$ and $E_7$, in diagrams A and C of FIGURE 3, represent group invariant signal elements of the 7-element signal groups illustrated in the diagrams. This would also be true, for example, of stop and start elements alternating in polarity or signalling condition either in successive group intervals, or according to some predetermined rule, since such an alteration would involve a predetermined variation, as defined above. Thus, in general, any conceivable arrangement of stop-start signalling would, in conformance with the present terminology, involve the handling of one or more group invariant signal elements.

The second observation to be made in connection with the arrangement of FIG. 3 concerns the fact that the stop-start signal element transition serves as a group defining signal which synchronously designates the initiation of each group. Accordingly, each such transition provides a synchronous group time reference relative to which the time location of each of the intelligence elements $E_2$ to $E_6$, of the 7-element groups, $E_1$ to $E_7$, may be synchronously specified.

The final observation concerns the fact that the signal arrangement in FIG. 3B, with the invariant stop-start elements deleted, is, in reality, an ungrouped arrangement which is generally indistinguishable from any succession of code signal intelligence in any other signalling code. It is this last observation which forms the basis for the present invention, applicants herein having observed that any coded intelligence may be indiscriminately transferred thru the exchange provided that none of the intelligence is deleted during reception and also providing that no elements are reinserted during retransmission. In other words, applicants herein have invented a system wherein a continuous binary stream of signals arranged in indeterminate intelligence groupings may be transferred from any exchange receiving line $r_j$ to any retransmitting line $t_k$ with no intervening modifications introduced. In a more general sense, applicants herein have proposed a system wherein the function of a repeating element in a telecommunication system can be extended so as to provide selective rearrangements of intelligence signal groups of a message with invariant group elements selectively deleted. The latter more general expression clearly encompasses, in addition to the signal modifications illustrated in FIG. 3, a wide variety of cryptographic application in which, for purposes of secrecy, correlation, or the like, the elements of a message are arranged in generally unintelligible signal groups requiring a selectively programmed decoding unit as a deciphering instrument.

Returning to the more specific application of the present invention, the arrangement of FIG. 1 is more particularly illustrated in FIG. 2, with a randomly chosen receiving unit $X_j$ and a randomly chosen retransmitting unit $Y_k$, shown in greater detail, the two units further being selectively coupled thru the previously mentioned exchange 6. In the receiving unit $X_j$ signals on the receiving line $r_j$, are applied to a sampling circuit 23, having timed sampling pulses, *b*, applied thereto by means of a conductor 18. The signals sampled in circuit 23 are transferred exclusively to one of two conductors 24 or 25 under the respective control of signals designated S and T, applied by means of conductors 21 and 22 respectively. The signals S and T are bi-level signals of opposite binary value derived from a bi-stable mode selection circuit 49. These signals are utilized thruout the receiving unit to selectively control the mode of signal reception as will be clear from the following.

Considering, for example, the conventional signal transfer arrangement sequentially illustrated in timing diagrams A, B and C of FIGURE 3, unit $X_j$ provides the transition between FIGS. 3A and 3B, in what had previously been the exclusive mode of reception, by means of a selective conditioning, manually or otherwise, of the mode selection circuit 49, in which the signal T is in a "high" or "enabling" condition, while the signal S is in a "low" or "disabling" condition. The terms "enabling" and "disabling" utilized in the foregoing are intended to denote, respectively, conditions wherein logic circuits, or gates, controlled by the respective signals are correspondingly enabled or disabled. Accordingly, the signals S and T, are applied as gate enabling signals to selectively channel the signal $r_j$ on receiving line 20 to output conductors 24 and 25, respectively. Conductors 24 and 25 are respectively coupled to stages $1R_5$ and $1R_6$ of a buffer register generally identified as 1R. Register 1R is a shift register in which the direction of advance of the shifted elements is generally indicated by the arrow at 26. The sampling pulses, *b*, previously considered are also applied as shift pulses to shift register 1R by means of conductor 27. These pulses, *b*, obtained from a timing unit 47, coincide with the approximate mid-points of the expected time positions of the sampled message elements. In the particular illustration of FIGURE 2, the message elements are received in groups of 5 or 7 elements, depending respectively on which of the signals, S or T, is in the "high" or "enabling" condition. When signal T is "high," the message signals received in 7-element groups are shifted into the shift register 1R at stage thereof. The 7-element groups so received, are arranged in the form of a start signal element followed by five intelligence signal elements, in turn followed by a stop signal element. Upon receipt of the stop signal element in state $1R_6$, a timing pulse *g*, derived from the pulse *b* associated with the received stop element is applied as an "enabling" signal, to a group of gates 1G, including individual gates $1G_1$ to $1G_5$, which are respectively connected to the outputs of register stages $1R_1$ to $1R_5$. At the time of occurrence of each timing signal *g*, register stages $1R_1$ to $1R_5$ contain the five variable intelligence elements of the 7-element received signal groups and, accordingly, the intelligence transferred to the outputs of the gates $1G_1$ to $1G_5$, will comprise all but the start and stop elements of the received message. The outputs of the gates $1G_1$ to $1G_5$ are respectively coupled to inputs of corresponding stages $2R_1$ to $2R_5$ of a second buffer register 2R and the outputs of the register 2R, identified as $2r_{1-5}$ are coupled by means of five conductors shown diagrammatically as a single conductor 40, into the exchange 6. Following each transfer of 5-element intelligence signal groups into the register **2*r*, the exchange 6, is apprised of the availability of the new intelligence group register 2*r*** by means of the application of the transfer signals *g* to appropriate sensory units in the exchange, by means of conductor 51, and the contents of the register 2R are thereafter transferred into the exchange under the control of exchange timing signals. The operation thus far described, in connection with a "high enabling" signal T, is similar to the conventional operation normally associated with the transfer of intelligence thru prior art exchanges. However, upon the conditioning of the mode selection unit 49 so that the signal S is in the "high" condition, a quite different sequence of operations occurs.

With signal S in the "high" condition, the signals $r_j$ are sampled as before in receiving unit 23, but are transferred thronugh conductor 24, to stage $1R_5$ of register 1R, stage $1R_6$ of register 1R. Further, the group timing pulses *g*, previously from the seventh group timing pulse corresponding to the stop signal element of each received group, are now derived from each fifth timing pulse corresponding to the fifth element of each received signal group. Thus, upon the occurrence of each pulse *g*, the intelligence in stages $1R_{1-5}$ of register 1R is transferred to the respective stages $2R_1$ to $2R_5$ of register 2R. The intelligence so transferred includes all of the received intelligence, since the group timing signals *g* are spaced 5-elements apart and the shift register length is effectively shortened to five stages. The foregoing modified selection of the group timing signal *g* is controlled, as indicated, by the "enabling" signal S on conductor 43 which is coupled into the timing unit 47, the previous operation having been controlled by the "enabling" signal T on conductor 44, also coupled to the timing unit 47.

After routing thru the exchange 6 in accordance with routing instructions contained within the message heading as translated thru the receiving unit $X_j$, the message is retransmitted on an outgoing line $t_k$, thru a selectively variable retransmitting unit $Y_k$, connected between the exchange 6, and the outgoing line. The retransmitting unit is provided with two selective modes of operation corresponding to the previously described modes associated with the receiving unit signals S and T, respectively. These retransmitting modes are respectively associated with signals $\underline{S}$ and $\underline{T}$, underscoring being used in this instance and throughout in the retransmitting unit to distinguish similarly functioning blocks in the receiving and retransmitting units. In the mode corresponding to the "high" condition of signal $\underline{T}$, the retransmitting unit inserts invariant stop and start elements into the message forwarded to the outgoing line, while in the mode corresponding to the "high" condition of signal $\underline{S}$, no additional signal elements are inserted into the message.

It will be noted that for any given message to be retransmitted the $\underline{S}$ and $\underline{T}$ modes of the retransmitting unit may be selected in accordance with the corresponding $\underline{S}$ or $\underline{T}$ mode selected in the receiving unit during the previous reception of the given message. It should further be noted that the $\underline{S}$ and $\underline{T}$ modes of the retransmitting unit may also be selected independently of the mode required for the previous reception of a message currently being retransmitted.

For instance, a message previously received in the $\underline{S}$ mode may be retransmitted in the $\underline{T}$ mode with group invariant start and stop elements inserted between each consecutive set of five variant signal elements of the message. In this arrangement, the five elements of the groups thus distinguished are not necessarialy intelligible as grouped, but the retransmitted message may be compatibly received by a receiving unit of a second exchange through which the message must pass to reach its ultimate destination. It should be noted that the receiving unit of the second exchange need only be capable of receiving messages arranged in one format; namely messages arranged in 7-element signal groups each having 5 variant elements and start and stop invariant signal elements.

In another arrangement, in the exchange of this invention, a message is retransmitted in the $\underline{S}$ mode although it was received with the receiving unit set in the $\underline{T}$ mode. In this arrangement, it is not essential that the message be retransmitted at the same bit rate as the received message; it is only required that the retransmitting unit and the receiving apparatus receiving signals from that unit, be synchronously operated. Thus, the full bandwidth capabilities, of the retransmission channel through which the retransmitted message must propagate, may be most advantageously utilized, regardless of the bandwidth capacity of the channel preceding the exchange receiving unit.

Referring to the more detailed block schematic of FIGURE 2 illustrating the retransmitting unit $Y_k$, the message intelligence forwarded thru the exchange 6 is applied, by means of a conductor 50, to a first retransmitting buffer shift register $1\underline{R}$. The elements on conductor 50 are received in 5-element groups by means of shift pulses furnished by the exchange, thru a shift bus 53 coupled to register $1\underline{R}$. As in the receiving unit, the retransmitting unit includes a timing unit 58 which provides group timing signals $\underline{g}$ which are coupled, by means of conductor 56, to appropriate sensory units within the exchange 6, thereby apprising the exchange of the completed retransmission of each group of five signal elements transferred therefrom.

Accordingly, following each such signal, the next successive five-element group in the message being retransmitted, is deposited in stages $1\underline{R}_{1-5}$ of register $1\underline{R}$, by means of five appropriately timed shift pulses introduced on shift bus 53, and, when the following signal $\underline{g}$ occurs, the contents of register $1\underline{R}$ are transferred in parallel to the five stages $2\underline{R}_1$ to $2\underline{R}_5$ of the second buffer register $2\underline{R}$ thru 5 corresponding gates $1\underline{G}_1$ to $1\underline{G}_5$ of a group of gates generally identified at $1\underline{G}$, these gates being enabled by the signals $\underline{g}$ derived from timing unit 58, and coupled to said gates by means of conductor 60. After each 5-element group has been stored in register $2\underline{R}$, a timing cycle including basic intervals defined by signals furnished by timing and counting unit 58; these signals being generally identified at 74 and 75 in the figure as signals $1\underline{C}_{1-7}$; is utilized to deliver the elements of the signal groups in register $2\underline{R}$ to the outgoing line $t_k$ in a variable sequence determined by the relatively exclusive signaling conditions $\underline{S}$ and $\underline{T}$, in conjunction with an electronic signal scanner 63 connected between the outputs of register $2\underline{R}$ and the outgoing line. For example, is signal $\underline{S}$ is in the "high" condition, timing signals $1C_{1-7}$, upon application to signal scanner 63, will sequentially deliver elements corresponding to the outputs $2r_{1-5}$ to the outgoing line in uninterrupted sequence. The pulse time duration of the sequence is defined by rythmically occurring timing signals $1C_{1-5}$, these signals being repeated without interruption or hiatus, each group being further distinguished only in time from each other group by the group timing signals g selected in accordance with the "high" signal S. In this mode of operation, the signals $1C_{1-5}$ are respectively associated with the intelligence elements $2r_{1-5}$ and govern the delivery of each corresponding element to the outgoing line $t_k$.

On the other hand, if signal T is in the "high" condition, each timing cycle includes a consecutive sequence of timing signals $1C_{1-7}$ terminated by timining signals g. In this mode of operation, the signal scanner is controlled by the signal T thru conductor 67, to scan the signal elements comprising the five elements in register 2R and invariant stop and start signal elements obtained from sources coupled to the scanner through the respective conductors 61 and 62. Further, in this mode timing signal $1C_1$ is associated with the start signal element, timing signals $1C_{2-6}$ are respectively associated with the intelligence elements $2r_{1-5}$, and timing signal $1C_7$ is associated with the stop signaling element. As indicated in FIG. 2, the retransmitting selection signals S and T are provided by a mode selection unit 70.

As indicated further in FIG. 2, mode selection units 49 and 70 in receiving unit $X_j$ and retransmitting unit $Y_j$, respectively, are controlled by means of solid line conductors 14 and 64 respectively and also by means of respective controls indicated by the dotted lines at 41 and 65. The latter dotted line controls are intended to represent automatic mode selection control signals which are optionally coupled to detecting circuits included in the respective mode selection units, and these signals are utilized to automatically vary the cycling of the receiving and retransmitting units, as required for each message transferred therethrough, as will be further described in connection with FIG. 9. The controls 14 and 64 are manual controls operating, for example, thru push button switches, or the like, to selectively establish the required signaling conditions.

Referring to FIG. 4, an alternative circuit arrangement for use in the receiving units of FIG. 1, is illustrated therein, this arrangement being concerned with the acquisition and selective scanning of signals by the receiving units. In this embodiment the signals $r_j$ on receiving line 20 are sampled by means of timing signals $b$ obtained from the timing unit 47 as in the operation of FIG. 2. However, the sampling herein occurs at a gate 81 which delivers all of the sampled signals to an electronic distributing circuit $1d$ thru a connecting conductor 75. In this embodiment, timing intervals are defined by relatively exclusive signals $1C_{1-7}$ which were previously available for use within the timing unit 47 of FIG. 2, as disclosed in the discussion below of FIGURE 5 although not utilized external to the timing unit in FIGURE 2 because of the operation of shift register 1R. The signals $1C_{1-7}$ are applied to distributor 1D to variably distribute the sampled signals to outgoing lines $1D_{1-7}$ thereof. The mode selection signals S and T applied to distributor 1D through conductors 76 and 77, respectively, serve to variably determine the channeling of the sampled signals to the outgoing lines, $1D_{1-7}$.

Assuming, for example, that selection signal T is "high," seven consecutive distributive timing signals $1C_{1-7}$ will follow each group timing pulse $g$, and the corresponding sampled elements of signal $r_j$ will be delivered to output conductors $1D_{1-7}$ consecutively. The signal element delivered to output conductor $1D_1$ will be the start signal element of each received group while that delivered to $1D_7$ will be the corresponding group stop element. Accordingly, since conductors $1D_{2-6}$ are respectively coupled to stages $1R_{1-5}$ of register 1R, only the received variable intelligence signals will be entered into register 1R, while the invariant stop and start signaling elements will be excluded therefrom. As seen in the figure, the outputs of register 1R, are grouped for simplicity on a single conductor 83 coupled to the group of gates 1G, also shown diagrammatically as a single gate, in the illustration. The outputs 85 of the gates 1G are determined by the enabling signals $g$, applied to the gates through conductor 86.

On the other hand, with signal S in the "high" condition, the timing intervals or steps of the timing cycles defined by the signals $g$, are exclusively associated with the timing signals $1C_{1-5}$, the other two signals being omitted in this mode. Further, the resultant operation of the distributor 1D involves the channeling of signals in sequence to conductors $1D_{2-6}$, conductors $1D_1$ and $1D_7$ being omitted from the distribution cycle. Accordingly, the received intelligence is distributed in five element groups into register 1R, with no time gaps between the groups so distributed, and all of the received intelligence is thereby forwarded thru the gates 1G.

Details as to the circuits utilized in distributor 1D are shown in FIG. 4A wherein it is seen that the signals received on conductor 75 are applied to two different sets of coincidence gates identified respectively as 2G and 3G. Set 2G includes seven individual gates $2G_{1-7}$ while gate set 3G includes five individual gates $3G_{1-5}$. Each of the gates $2G_{1-7}$ is controlled by mode selection signal T thru the branches of conductor 77 shown in the drawing. Similarly, each of the gates $3G_{1-5}$ is controlled by the signal S delivered thereto by branches of conductor 76. In addition to the mode selection controls, the gates $2G_{1-7}$ are further controlled by the respective timing signals $1C_{1-7}$ while gates $3G_{1-5}$ are respectively controlled by timing signals $1C_{1-5}$.

As further indicated in the figure, the gates $3G_{1-5}$ are respectively coupled to or-gates $10_1$ to $10_5$, having respective output conductors, $1D_2$ to $1D_6$. Further, the outputs of gates $2G_{2-6}$ are respectively coupled to the or-gates $10_{1-5}$, while the outputs of gates $2G_1$ and $2G_7$ are directly coupled to conductors $1D_1$ and $1D_7$. Thus, it is readily seen that with enabling signal S in the "high" condition only gates 3G are operative and the outputs thereof are cyclically and sequentially scanned by timing signals $1C_{1-5}$, while in the opposite receiving mode, signal T exclusively enables gates 2G, and these gates are sequentially and cyclically scanned by the corresponding timing signals $1C_{1-7}$ which deliver all but the start-stop elements to the register 1R of FIGURE 4. It should be noted that the gates $2G_1$ and $2G_7$ serve no useful function in the illustrated equipment, but are shown for the sake of completeness since the detection and handling of the start-stop elements is generally necessary in connection with error detection circuits not considered herein.

Referring to FIG. 5, the timing unit 47 and mode selection means 49 are shown in greater detail therein. Unit 47 is seen to include a local oscillator 96 which is energized by signals appearing on conductor 94 and de-energized by the group timing signals $g$, appearing on conductor 95. The signals on conductor 94 are obtained from a start-stop signal detector comprising a coincidence gate 90 having two control inputs coupled thereto through conductors 91 and 92 and a third input comprising the receiving line signals $r_j$ supplied through conductor 45, as shown in both FIGS. 2 and 5. One of the control signals is indicated as timing step signal $1C_1$ at conductor 91, and the other control signal is indicated as the mode selection signal T at conductor 92. With the two control signals in the "enabling" or "high" condition, the ensuing space to mark signaling transition of the signal $r_j$, corresponding to the transition between stop and start elements, is coupled as an enabling signal through conductor 94 and or-gate 89 to a local timing oscillator 96 which thereupon generates the timing pulses $b$. These pulses are coupled, thru an or-gate 97, to the conductor 27 of FIG. 2, and also to a counting circuit 1C, having seven relatively exclusive output signaling conditions $1C_{1-7}$ associated therewith, these output conditions providing the timing steps $1C_{1-7}$, previously considered herein. The sequential conditions $1C_{1-7}$ are utilized to variably select the group timing signals $g$ from the pulses $b$, in accordance with the mode selection signals S and T. Output $1C_5$ of the counter is applied in conjunction with signal S to and-gate 102 while counter output $1C_7$ is applied in conjunction with signal T to and-gate 101. The timing pulses $b$ are applied to both gates 101 and 102, and the outputs of gates 101 and 102 are logically combined in an or-gate 103, appearing at the output thereof as the timing signals $g$. Each group timing signal $g$ is utilized to reset counter 1C to its initial state wherein the output $1C_1$ is in a "high" condition, each such resetting thereby defining the termination of a receiving cycle. It is thus apparent that each receiving cycle involves 5 or 7 cycling steps depending respectively on the "high" conditioning of the signals S and T. The signals S and T are illustrated as signals obtained from conductors 43 and 44 respectively within the mode selection device 49. Conductors 43 and 44 are connected as shown to oppositely conditioned outputs of a mode selection flip-flop 1F, which is triggered to opposite stable conditions by means of triggering input signals applied to conductors 108 and 109.

It should be noted that the local oscillator 96 is turned on only when signal T is in the "high" condition and counter 1C is in its initial state. It is, therefore, evident that messages received in accordance with a "high" condition of the signal S, must be accompanied by synchronizing signals which in some manner identify the message elements. In other words, in the absence of group identifying start-stop signal elements, the received message elements are indistinguishable unless an additional time reference is delivered along with the signals. In the embodiment of FIG. 5, the additional time reference is supplied in the form of externally originating element sychronization signals which are applied to or-gate 97 by means of conductor 46, and pass thru the or-gate as the sampling signals $b$. Many variations of this arrangement are possible. For example, the externally derived synchronizing signals may be group synchronizing signals accompanying each fifth transmitted signal element, these group synchronizing elements being utilized to turn on the local oscillator 96, and thereby maintain the synchronism of the group timing signals $g$. It should further be noted that the externally derived synchronizing signals may be delivered via a separate line 46, or on the receiving line 45 of FIGURE 2, as indicated by the dotted line 11 between lines 45 and 46, providing that in the latter instance means are provided for discriminating between the synchronization and message intelligence signals.

Details regarding the cycling of the retransmitting unit are supplied in FIG. 8, wherein the electronic signal scanner 63 is generally shown to include two groups of gates $\underline{2G}$ and $\underline{3G}$ in an arrangement similar to that associated with the signal distribution in FIG. 4A. Gating group $\underline{2G}$ includes seven individual gates $\underline{2G}_{1-7}$ all controlled by the mode selective signal $\underline{T}$, applied thru branches of conductor 149 as shown. Similarly, gating group $\underline{3G}$ includes five individual gates $\underline{3G}_{1-5}$ controlled by the signal S applied thru branches of conductors 151 as shown. The outputs $\underline{2r}_{1-5}$ of buffer register $\underline{2R}$ of FIG. 2 are applied to the respective gates $\underline{2G}_{2-6}$ of gating group $\underline{2G}$ and also to the respective gates $\underline{3G}_{1-5}$ of gating group $\underline{3G}$. The transfer of the signal conditions $\underline{2r}_{1-5}$ thru the associated gates is further governed by the sequential application of timing signals $\underline{1C}_{1-7}$ to the respective gates $\underline{2G}_{1-7}$, and the application of timing signals $\underline{1C}_{1-5}$ to the gates $\underline{3G}_{1-5}$. The outputs of all of the above-mentioned gates generally designated at 159 and 158 in FIG. 8 are logically combined in an or-gate 159, having an output transmission line conductor 68 bearing the out-going retransmitted signals $t_k$. With signal $\underline{S}$ in the "high" condition, gates $\underline{3G}$ are partially enabled, and the signals $\underline{1C}_{1-5}$ sequentially define enabling signals which serially introduce the elements $\underline{2r}_{1-5}$ to the outgoing conductor 68 in uninterrupted sequences. On the other hand, during the "high" condition of signal T the signals $\underline{1C}_{1-7}$ sequentially enable gates $\underline{2G}_{1-7}$, and thereby serially introduce the signal elements $\underline{2r}_{1-5}$ to the output conductor 68 during the intervals associated with the enabling of gates $\underline{2G}_{2-6}$. During the intervals associated with the enabling of gates $\underline{2G}_1$ and $\underline{2G}_7$, start and stop signals are respectively provided by invariant signal sources coupled to the respective gates through conductors 146 and 147. The timing signals $\underline{1C}_{1-7}$ are obtained as the output signaling conditions of a seven state counting circuit $\underline{1C}$, which is established initially in state $\underline{1C}_1$ by the group timing signals $\underline{g}$ applied thru reset conductor 161. In this figure the signals $\underline{g}$ are derived by means of and-gates 168 and 169, respectively controlled by the signals $\underline{S}$ and $\underline{T}$, and further respectively controlled by the time state signals $\underline{1C}_5$ and $\underline{1C}_7$. Both gates are sampled by element timing signals $\underline{b}$ which are also applied to the input of counter $\underline{1C}$ as triggering inputs initiating each step in the cycling thereof. The outputs of the gates 168 and 169 are combined in an or-gate 170 having an output conductor 171 bearing the timing signals $\underline{g}$. Accordingly, either the fifth or seventh pulse $\underline{b}$ associated with the fifth or seventh respective states of the counter $\underline{1C}$, during the cycling thereof, is transferred as a group timing pulse $\underline{g}$ to conductor 171, depending respectively upon whether signal $\underline{S}$ or $\underline{T}$ is in the "high" condition.

Each signal $\underline{b}$ is obtained as the output of an or-gate 162 which is provided with external element synchronization signals 163 during transmission of messages associated with the "high" signaling condition of signal $\underline{S}$. The other input to or-gate 162 is obtained from a local source of timing oscillations 164 which is disabled when counter $\underline{1C}$ is in the state associated with the "high" condition of counter output $\underline{1C}_7$, and enabled when counter $\underline{1C}$ is in its initial state wherein $\underline{1C}_1$ is "high." The enabling is accomplished by means of and-gate 156 which transfers a signal $\underline{g}$, obtained from the group timing signal $\underline{g}$, by means of a fixed delay (not shown) in conjunction with the $\underline{1C}_1$ state of counter 1C and the high signaling condition of signal $\underline{T}$.

Further, the signals $\underline{S}$ and $\underline{T}$ are indicated as opposite output signaling conditions on conductors 177 and 178 of a mode selection flip-flop 70 conditioned to its opposite states, wherein the signals $\underline{S}$ and $\underline{T}$ are respectively in the "high" condition, by means of triggering signals applied to terminals 175 and 176 respectively, these signals being derived either from manual manipulation of button switches and the like, or by means of automatic mode selection signalling instructions obtained directly through the switching exchange. The manual controls are indicated at 64 in FIG. 1, while the automatic switching instruction connection is indicated at the dotted line 65 in FIG. 1.

The foregoing timing operations are more particularly illustrated in FIGS. 6 and 7. Both FIGS. 6 and 7 include two groups, A and B of timing diagrams. In FIG. 6 each timing diagram group, A and B, include six waveform timing diagrams which respectively characterize the signals previously identified as the receiving line signal $r_j$, the element sampling signals $b$, the group cycling signal $g$, and the sequential timing signals $1C_{1-7}$ associated with the counter 1C. Similarly, each timing diagram group A and B of FIG. 7 includes six waveform timing diagrams respectively indicating the signals previously identified as element timing signals b, group timing signals $g$, the signals $1C_{1-7}$ associated with the states of counter 1C and the retransmitted signals $t_k$ resulting from the output scanning operation.

In FIG. 6A, it is assumed that the signals $r_j$ being handled by the receiving unit are similar to those shown in FIG. 3A, and further that the mode selection unit 49 of FIG. 2 is established in the state wherein signal T is "high." Accordingly, it is seen that each signal $g$, as, for example, the signal identified at 120 in FIG. 6A, is associated with a preceding group of six timing signals $b$, and coincident with a seventh timing signal $b$, as indicated by the extended dotted line 122. The above-mentioned 7 timing singals $b$ are respectively associated with the mid-points of signal elements $E_1$ to $E_7$ of a received code character group. The elements $E_2$ to $E_6$ of this group define a code intelligence item $i_2$ as in FIG. 3, while the elements $E_1$ and $E_7$ respectively define invariant start and stop signal conditions. Further, it is seen that output signal $1C_1$ of counter 1C is initiated in coincidence with the preceding timing signal $g$ and terminated by the following element sampling signal $b$. Upon termination of signal $1C_1$, it is further seen that signal $1C_2$ assumes the "high" condition, which is thereafter terminated by the next successive pulse $b$. The other states of counter 1C are thereafter triggered in succession as indicated by the intervening dotted line 121 until state $1C_7$ is initiated by the sixth timing pulse $b$, and thereafter terminated by the pulse $g$, as indicated by the dotted line at 122. In contrast, the timing diagram group in FIG. 6B is illustrative of the cycling sequence associated with the high condition of signal S. Here, the intelligence item $i_2'$ is indicated as following immediately after intelligence item $i_1'$ and immediately preceding intelligence item $i_3'$ with no intervening invariant signal elements. Further, it is seen that counter outputs $1C_6$ and $1C_7$ remain quiescent thruout the cycling of the counter with state $1C_1$ immediately following state $1C_5$ as indicated by the dotted line at 125 and states $1C_{1-5}$ progressing in a sequence as indicated by dotted line 124. Thus, the intelligence is received in five element groups and transferred in five element groups, with no intervening exclusion of elements.

Similarly, the two groups of diagrams A and B of FIG. 7 illustrate the distinction between timing cycles associated with the high conditions of the respective signals T and S, this distinction being noted in group B by the quiescent condition of outputs $1C_6$ and $1C_7$ of counter 1C. The relative progression of timing states is indicated respectively by the dotted lines 131 and 135 of groups A and B joining the terminating portion, of the high condition of signal $1C_2$, to the initiating portion of the high condition of outputs $1C_7$ and $1C_5$, respectively. Another distinction to be noted in FIG. 7 is that the signal elements $t_k$ are initiated and terminated in conjunction with the initiation and termination of the corresponding timing intervals $1C_{1-7}$, whereas in FIG. 6 the mid-points of the elements of the signal $r_j$ are defined by the initiations of the output states $1C_{1-7}$ of counter 1C.

Finally, in FIG. 9, the automatic conditioning of the mode selection means 49 is accomplished as follows: The mode selection flip-flop 1F is conditioned to provide high signals S and T, respectively, by triggering outputs of or-gates 250 and 251, respectively. Or-gates 250 and 251 are provided with manual inputs at 108 and 109 respectively as in FIGURE 5. Additionally, these or-gates are provided with automatic mode selection signals on conductors 225 and 214, respectively. The outputs of gates 250 and 251 establish the respective signaling conditions hereinafter termed $1F_1$, and $1F_0$, which in turn are respectively associated with the "high" conditions of signals S and T. The triggering signals on conductor 214 are further derived as follows: Receiving line 20 bearing the signals $r_j$ is indicated as being further connected to a relatively remote switch 200, a relatively long distance being shown by means of the dotted lines 202. The signal source transmitting the signals $r_j$, is therefore associated with one of the conductors shown generally at 201. Thus, any one of a plurality of differently coded signaling sources may be connected to conductor 20. Conductor 20 is connected, as shown, to receiving block 199 encompassing the buffer receiving registers 1R and 2R of FIG. 2 and the sampling circuit 23 of FIG. 2. The outputs $2r_{1-5}$ shown diagrammatically 198 in the figure are coupled to a shift register 203, and selectively transferred in parallel into predetermined stages of the shift register by the signals $g$ as indicated at 210. A simple coincident logic device consisting of a coincident gating arrangement is utilized to logically detect particular overall states of the register 203. The register 203 is shifted by signals not shown, in such fashion that between successive group timing signals $g$, five shift intervals are established, thereby transferring the received intelligence in uninterrupted sequences,, with invariant start and stop elements excluded as in preceding discussions.

As is well known to those skilled in the art, each message in conventional telegraphy is subdivided into a message heading which is followed by a message text, the former bearing routing instructions and other message handling control signals, and the latter comprising the intelligence intended for the ultimate message recipient. Further, in conventional telegraphy, the termination of each message portion is indicated by respective end of heading (EOH) and end of mesage (EOM) code character signal sequences. In the illustration of FIG. 9, the logic circuit 205, is shown with two output conductors 206 and 207 bearing the respective appellations EOH and EOM. In accordance with the foregoing designations, circuit 205 uniquely detects two different signal element assemblages (in both the $1F_1$ and $1F_0$ receiving modes), and provides signals on the respective conductors 206 and 207 indicative of the foregoing detection, and thus indicative of the termination of the respective message segment. These signals are normally used to condition the exchange to perform appropriate different operations on the intelligence following each signal. In accordance with this invention, the signals on conductors 206 and 207 are combined in or-gate 208, to provide a single indication on conductor 209 coupled thereto, of the message segment termination. This signal is a pulse signal which is utilized as shown to condition a flip-flop 2F to the stable state $1F_1$ (its "1" state) wherein the associated "high" condition of the output designated $2F_1$ enables the AND gate 211, coupled thereto Thus, the next successive group timing signal $g$ coupled to the gate 211 through conductor 212 will appear at the ouput conductor 213 of the gate. The pulse on conductor 213 is utilized, as shown, to condition flip-flop 3F to the state $3F_1$ and also to condition the mode selection flip-flop 1F to the state $1F_0$ through or-gate 251, thereby establishing the signal T in the "high" or enabling condition. The signal on conductor 209 which establishes flip-flop 2F in the state $1F_1$ is also applied to a gate 216, controlled through conductor 217, by a signal identified as $1C_1$. The latter signal is a complementary enabling signal which is present at all times, except when the counter 1C of FIG. 5 is in the reset, or $1C_1$, condition. The output of gate 216 is coupled through conductor 218 to the start-stop oscillator 96 of FIG. 5 to enable that oscillator in the event it had previously been disabled, so that the remaining elements of the message segment being received, if any, may be completely cycled through the receiving buffer registers.

Following the conditioning of flip-flops 1F and 3F by the signal on conductor 213, the switch 200 is connected to a predetermined input conductor, over which the next seven element start-stop character will be received. This character is received in the manner previously described in connection with the "high" condition of signal T, of FIG. 2. In this connection, it should be noted that after flip-flop 3F is set to the $1F_1$ condition, the enabling output $3F_1$ is applied to a gate 215 through a delay element *d* which introduces a predetermined delay, also termed *d*, between the time at which the flip-flop is switched and that at which the gate 215 is enabled. The other signal input to the gate, indentified as *g'*, is a pulse signal delayed by a predetermined amount from the signal *g*. The last mentioned delay is greater than the delay *d*. Accordingly, the signal *g'* associated with the second signal *g* following the conditioning of flip-flop 3F to the state $1F_1$, is passed through the gate to the output conductor 222 thereof, where it is identified as pulse signal M (mode selection control signal). The mode selection control signal M is applied to a logical gating circuit 224 through conductor 223. This gating circuit, 224, responds to the last received character and emits a pulse if the intelligence associated with the five signal elements $2r_{1-5}$ specifies an ensuing mode selection condition wherein signal S is to be "high," the associated condition being achieved by the triggering of flip-flop 1F by a pulse signal on conductor 225 transferred through the or-gate 250. On the other hand, if the next message segment, the signal T is to remain in the "high" condition, then no triggering signal is applied to conductor 225. Thus, following each message segment, the next receptive mode is automatically established.

While we have disclosed and described our invention in terms of a presently preferred embodiment, it should nevertheless be understood that the same is susceptible of numerous modifications and changes which will occur readily to those skilled in the art, and we do not, therefore, intend to be limited to the particular items described.

We claim:

1. In a telecommunication system, a receiving unit for receiving differently coded items of intelligence and for variably transferring signal element groups including said items in accordance with said different codes, said unit comprising receiving means for receiving the signal elements of said items, cyclic scanning means having a plurality of different scan cycles coupled to said receiving means for arranging said received signal elements in different element groups according to said different cycles, mode selection means coupled to said scanning means for selectively establishing said different cycles, and means coupled to said scanning means for exclusively transferring predetermined ones of said grouped elements.

2. In a telecommunication system, a retransmitting unit for variably scanning the elements of differently coded items of stored intelligence and for transmitting signal element groups including said scanned elements interlaced with predetermined signal elements in accordance with said different codes, said unit comprising means for storing the elements of said items in successive signal element groups of a predetermined number of elements, at least one source of predetermined signals, cyclic scanning means having a plurality of different scan cycles coupled to said storing means and said predetermined signal source for cyclically scanning the elements of said successive groups and said predetermined signals according to said different scan cycles, means coupled to said scanning means for transmitting each said scanned element, and mode selection means coupled to said scanning means for selectively establishing said different cycles.

3. A telecommunication switching center for handling differently coded messages comprising selectively variable receiving and retransmitting units for respectively receiving and retransmitting message signals and exchange switching means coupled between said receiving and retransmitting units for forwarding said message signals from each said receiving unit to a selected one of said retransmitting units, said receiving unit including variable scanning means for variably excluding predetermined ones of said received signal elements according to said different message codes, and said retransmitting unit including predetermined signal sources and variable scanning means coupled to said sources for selectively reinserting said excluded signal elements into said retransmitted messages.

4. In a telecommunication system, a receiving unit for receiving and variably forwarding signal elements of differently coded items of intelligence, said differently coded items being arranged in associated different signal element groups, each said different group having different predetermined arrangements therein of variant and invariant group elements, said unit comprising: receiving means for receiving said signal elements, cyclic scanning means having a plurality of different scanning cycles coupled to said receiving means for selectively rearranging said received signal element groups in accordance with said scanning cycles, transfer means coupled to said scanning means for selectively transferring predetermined ones of said scanned elements, and mode selection means coupled to said scanning means for selectively establishing said different cycles.

5. A system according to claim 4 wherein said scanning means includes among said different cycles, a first cycle for forwarding all said received signal elements to said transfer means and at least one different second cycle corresponding to one of said different codes for excluding said invariant group elements from said transfer means while said variant elements are being transferred therethrough.

6. A system according to claim 4 wherein said mode selection means includes manual controls for manually establishing said cycles.

7. A system according to claim 4 wherein said mode selection means includes first detection means responsive to different ones of said intelligence items for establishing said different cycles.

8. A system according to claim 7, wherein said mode selection means includes a source of control signals derived externally to said system and second detection means coupled to said source for detecting said control signal and for actuating said mode selection means in response thereto.

9. In a telecommunication system, a retransmititng unit for arranging stored intelligence signal elements into first groups and for selectively transmitting second signal element groups differing from said first groups and including said elements of said first groups interlaced with a selected number of invariant group signal elements which distinguish said first groups by their positions within said second groups and are detectable in terms of an invariant characteristic, said unit comprising means for successively storing said intelligence in said first groups, at least one source of invariant signals, cyclic scanning means having a plurality of different scanning cycles coupled to said source and said storing means for differently scanning elements of said groups and said source according to said different cycles, transmitting means coupled to said scanning means for forwarding said scanned signals and mode selection means coupled to said scanning means for establishing said different cycles.

10. A system according to claim 9, wherein said different scanning cycles include a first cycle for exclusively scanning said first groups, and a second cycle for scanning said first groups and for appending said invariant elements to each said scanned group.

11. A telecommunication system for handling differently coded messages comprising a source of messages of a first kind arranged in predetermined groups including a first number of variant intelligence elements intermingled with a second number of invariant elements a source of messages of a second kind comprised exclusively of elements arranged in an indeterminate grouping in relation to said predetermined groups, a receiving unit coupled to said sources for receiving and forwarding said messages of said first and second kinds, a retransmitting unit, and means coupled between said receiving and retransmitting units for forwarding messages from said receiving unit to said transmitting unit, said receiving unit including means for selectively deleting said invariant elements from said messages of said first kind, and said retransmitting unit including means for selectively reinserting said deleted elements into said retransmitted message.

12. A telecommunication switching center for handling differently coded messages comprising a multiplicity of selectively variable receiving and retransmitting units for respectively receiving and retransmitting messages, and exchange switching means coupled between said receiving and retransmitting units for forwarding said messages from each receiving unit to selected ones of said retransmitting units, each said receiving unit comprising a receiving line, a first buffer register, selectively variable scanning means coupled to said receiving line and said first buffer register for variably grouping received message signal elements in said first buffer register, said scanning means having different first and second cyclic scanning conditions associated therewith, mode selection means coupled to said cyclic scanning means for selectively establishing said first and second cyclic conditions, a second buffer register, transfer means coupled between stages of said first buffer register and said second buffer register for transferring signals fom said stages to said second buffer register, said cyclic scanning means further including means coupled to said mode selection means for variably generating group timing signals, and means for applying said group timing signals to said transfer means for enabling said transfer means; at least one of said retransmitting units further comprising first and second buffer registers, selective transfer means coupled between said registers for transferring signals from said first to said second buffer register, means coupled between said first buffer register and said exchange switching means for transferring signals from said exchange means to said first buffer register, means coupled to said second buffer register for variably scanning the signals stored therein, said variable scanning means having first and second cyclic scanning conditions associated therewith, means coupled to said scanning means for selectively establishing said first and second cyclic conditions, at least one source of invariant signals coupled to said scanning means, and transmitting means coupled to said scanning means for transmitting said scanned signals, said first cyclic conditions of said scanning means of said receiving and retransmitting units, respectively, deleting and inserting invariant message signal elements in said respective received and retransmitted messages.

No references cited.